(12) United States Patent
Jones et al.

(10) Patent No.: US 6,803,760 B2
(45) Date of Patent: Oct. 12, 2004

(54) APPARATUS AND METHOD FOR DETERMINING AN ANGULAR POSITION OF A ROTATING COMPONENT

(75) Inventors: Franklin B. Jones, Shrewsbury, MA (US); Stuart A. Jones, Wrentham, MA (US)

(73) Assignee: Comprehensive Power, Inc., Marlborough, MA (US)

( * ) Notice: Subject to any disclaimer, the term of this patent is extended or adjusted under 35 U.S.C. 154(b) by 0 days.

(21) Appl. No.: 10/460,448

(22) Filed: Jun. 12, 2003

(65) Prior Publication Data

US 2004/0021459 A1 Feb. 5, 2004

Related U.S. Application Data

(60) Provisional application No. 60/399,540, filed on Jul. 30, 2002.

(51) Int. Cl.[7] ................................................. G01B 7/30
(52) U.S. Cl. ............................. 324/207.25; 324/207.2
(58) Field of Search ............................ 324/207.2–207, 324/207.21, 207.22, 207.24, 207.25, 207.12–207.17, 251, 252, 173, 174; 338/32 R, 32 H

(56) References Cited

U.S. PATENT DOCUMENTS

| | | | | |
|---|---|---|---|---|
| 4,429,276 A | * | 1/1984 | Narimatsu et al. | 324/207.21 |
| 4,612,502 A | * | 9/1986 | Spies | 324/207.22 |
| 4,853,631 A | * | 8/1989 | Carmen | 324/207.21 |
| 5,530,345 A | * | 6/1996 | Murari et al. | 324/207.2 |
| 5,680,042 A | * | 10/1997 | Griffen et al. | 324/207.21 |
| 6,191,578 B1 | * | 2/2001 | Bezinge et al. | 324/207.21 |
| 6,232,739 B1 | | 5/2001 | Krefta et al. | |
| 6,246,233 B1 | * | 6/2001 | Griffen et al. | 324/207.21 |
| 6,307,365 B1 | * | 10/2001 | Santos et al. | 324/207.12 |

* cited by examiner

*Primary Examiner*—Jay Patidar
(74) *Attorney, Agent, or Firm*—Guerin & Rodriguez, LLP; William G. Guerin

(57) ABSTRACT

An apparatus for determining the angular position of a rotating component having a plurality of angularly spaced magnetic elements is described. The apparatus includes a sensor board and a processor circuit. The sensor board is disposed adjacent to the rotating component and includes a plurality of sensor groups. Each sensor group includes a plurality of magnetic sensors positioned to sense a magnetic field of one of the angularly spaced magnetic elements. Each sensor group generates a multi-state group signal in response to the passage of one of the angularly spaced magnetic elements. The processor circuit communicates with each of the sensor groups and generates position signals in response to the multi-state group signals.

10 Claims, 6 Drawing Sheets

APPARATUS AND METHOD FOR DETERMINING AN ANGULAR POSITION OF A ROTATING COMPONENT

CROSS-REFERENCE TO RELATED APPLICATIONS

This application claims the benefit of the filing date of co-pending U.S. provisional patent application Ser. No. 60/399,540, filed Jul. 30, 2002, titled "High Resolution Position Sensor for Permanent Magnet Motors," the entirety of which provisional application is incorporated by reference herein.

FIELD OF THE INVENTION

The invention relates generally to an apparatus and method for determining an angular position of a rotating component. More particularly, the invention relates to an apparatus and method for high resolution angular position sensing of permanent magnet rotors.

BACKGROUND

Control methods for conventional permanent magnet AC motors use the angular position of the rotor to control the electrical phase and frequency of the stator excitation currents. Failure to maintain the proper electrical phase relationship results in loss of torque production and reduced efficiency.

Various methods are used to determine the angular position of the rotor. For example, the electromotive force (EMF) of the machine is measured by sensing voltage at normal operating speeds. This method, however, is not effective at lower speeds or at stall because the EMF is small or zero. Incremental encoders are commonly used with induction machines but are not as useful with permanent magnet machines because the phase position of the magnets is not known at startup. Brushless DC motors and drives often use a set of three Hall-effect sensors to determine the angular positions of the permanent magnets. However, the angular resolution provided by the sensors is low, i.e., the position signal provides only six output states per magnet pole pair.

External sensor methods utilize components such as resolvers, optical encoders, and notched target wheels. These techniques are generally used to achieve high resolution for accurate control of position or low speed torque. External approaches are often costly, bulky and fragile. In addition, external sensors can require a large number of noise-sensitive signal wires and complex signal decoding techniques.

Accordingly, there exists a need for a simple, robust apparatus and method that determine the angular position of rotor magnets with high resolution for a range of operating speeds from stall to the maximum motor speed. The apparatus should provide a simple electrical interface for integration with other electrical components and systems. The present invention satisfies these needs and provides additional advantages.

SUMMARY OF THE INVENTION

In one aspect, the invention features an apparatus for determining an angular position of a rotating component having an axis of rotation and having a plurality of angularly spaced magnetic elements. The apparatus includes a sensor board and a processor circuit. The sensor board is disposed adjacent to the rotating component and includes a plurality of sensor groups. Each of the sensor groups includes a plurality of magnetic sensors positioned to sense a magnetic field of one of the angularly spaced magnetic elements. Each of the sensor groups generates a respective multi-state group signal in response to the passage of one of the angularly spaced magnetic elements by the respective sensor group. The processor circuit is in communication with each of the sensor groups and generates at least one position signal in response to the multi-state group signals. In one embodiment, the magnetic sensors of each sensor group are configured in parallel electrical communication.

In another aspect, the invention features a method of determining the angular position of a rotating component having a plurality of angularly spaced magnetic elements. The method includes generating, for each of a plurality of magnetic sensors in each of a plurality of sensor groups, a two-state signal responsive to the position of at least one of the angularly spaced magnetic elements of the rotating component relative to the magnetic sensor. The method also includes combining, for each of the sensor groups, the two-state signals generated by the respective magnetic sensors to generate a respective multi-state group signal and comparing the multi-state group signals to determine the angular position of the rotating component.

In another aspect, the invention features an apparatus for determining an angular position of a rotating component having a plurality of angularly spaced magnetic elements. The apparatus includes a sensor board having a plurality of magnetic sensors and a plurality of resistive elements. The magnetic sensors are configured in parallel electrical communication. Each magnetic sensor has a first terminal adapted to receive a first reference voltage and a second terminal. Each magnetic sensor electrically communicates the first terminal with the second terminal in the presence of a local magnetic field of a predetermined polarity. Each resistive element has a first terminal in electrical communication with the second terminal of a respective magnetic sensor and a second terminal adapted to receive a second reference voltage. In a further embodiment, the apparatus includes a channel circuit. The channel circuit has a first terminal in electrical communication with the second terminals of the resistive elements. The first terminal of the channel circuit is also in electrical communication with the first terminal of a sense resistor. The channel circuit has a second terminal in electrical communication with a second terminal of the sense resistor and a third terminal adapted to provide a voltage signal that indicates the number of magnetic sensors in the presence of the local magnetic field of the predetermined polarity. The voltage signal is responsive to a voltage difference between the first and second terminals of the channel circuit.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention relates to an apparatus and method for determining an angular position of a rotating component having angularly spaced magnetic elements. Angular position as used herein refers to the rotational position, or "clocking", about an axis of rotation. The rotating component can be, for example, the rotor of a motor or generator. The invention provides for improved angular resolution and can be implemented in a small package using simple hardware components. The apparatus is functional from stall (i.e., static) to the maximum operating speed of the rotating component.

Figure 1:
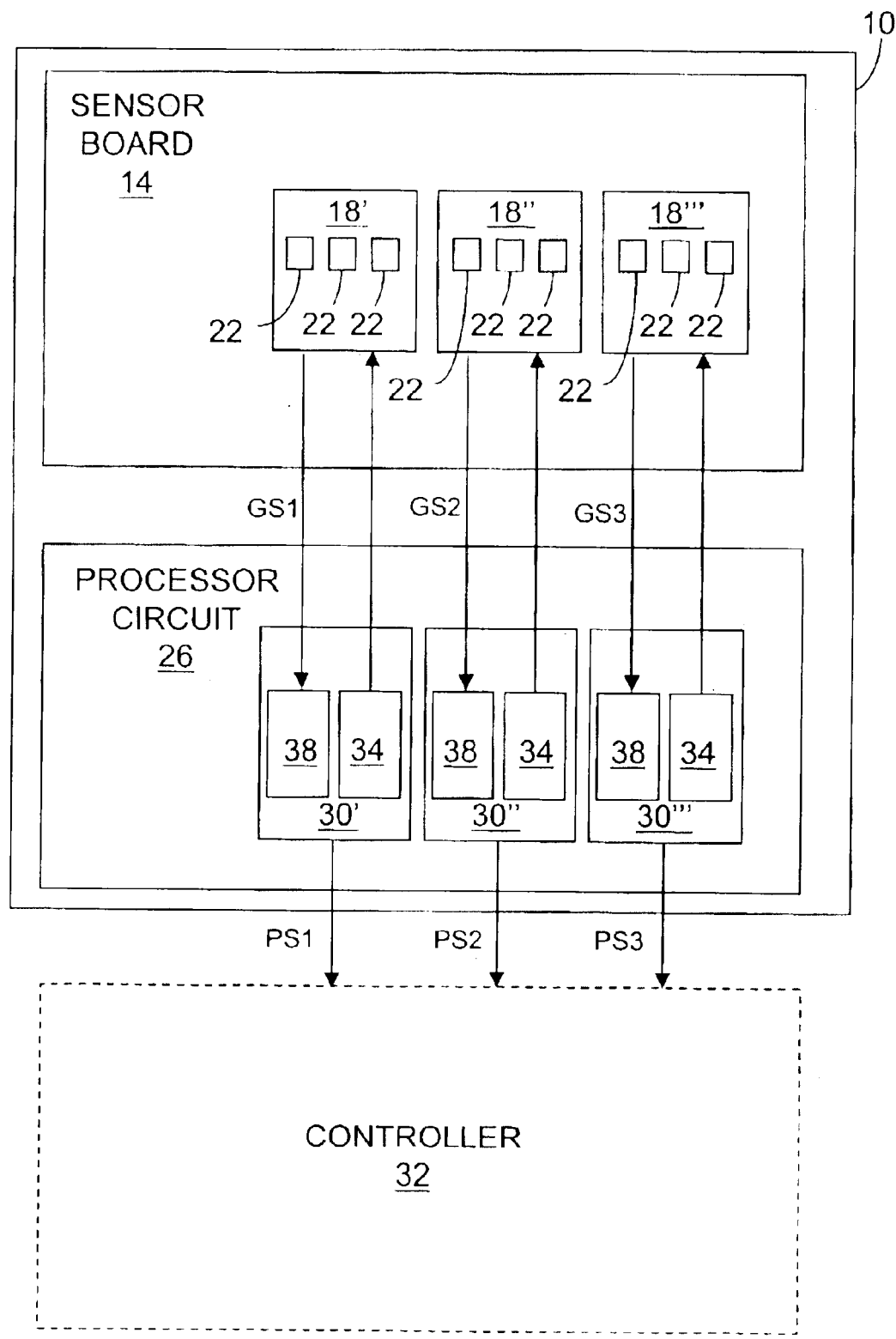
FIG. 1 is a block diagram of an embodiment of an apparatus for determining a position of a rotating component having an axis of rotation and a plurality of angularly spaced magnetic elements in accordance with the invention.

FIG. 1 is a high level block diagram of an embodiment of an apparatus 10 of the present invention. The apparatus 10 includes a sensor board 14 having three sensor groups 18', 18" and 18''' (generally 18). Each sensor group 18 includes multiple magnetic sensors 22 (only three shown for clarity) that sense one polarity of a local magnetic field. For example, the magnetic sensors can be responsive to a "north" magnetic field. Each magnetic sensor 22 provides a conductive path between two of its terminals in the presence of the north magnetic field. Conversely, each magnetic sensor 22 provides an open circuit between the two terminals when exposed to the opposite polarity (e.g., "south") of a magnetic field or when no magnetic field is present. The sensor board 14 is configured so that each magnetic sensor 22 generates a two-state electrical signal indicative of the presence or absence of the north magnetic field. The sensor groups 18 each generate a respective electrical group signal GS1, GS2 and GS3 (generally GS) based on the contribution of the two-state electrical signals from each of the respective magnetic sensors 22. The magnitude of the current in each electrical group signal GS is proportional to the number of magnetic sensors 22 in the group that detect the presence of a given polarity of the magnetic field.

The apparatus 10 also includes a processor circuit 26 having channel circuits 30', 30" and 30''' (generally 30) in electrical communication with respective sensor groups 18. Each channel circuit 30 includes a driver circuit 34 and a decoder circuit 38. Each driver circuit 34 applies a reference voltage to one terminal of each of the magnetic sensors 22 in the respective sensor group 18. Each decoder circuit 38 generates a respective voltage modulated position signal PS1, PS2 and PS3 (generally PS) having a voltage that is proportional to the magnitude of the current in the respective group signal GS. A controller 32 receives and decodes the position signals PS to provide the position of a rotating component (not shown). Decoding can include, by way of example, execution of a window comparator routine or a state transition routine.

Figure 2:
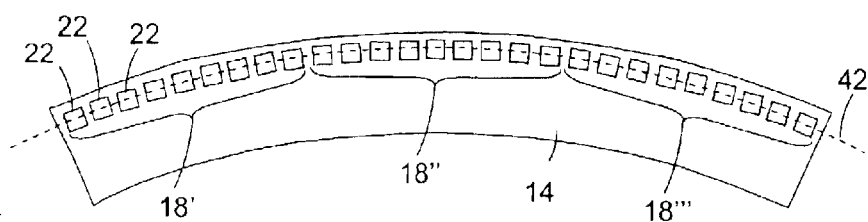
FIG. 2 is an illustration of an embodiment of a sensor board in accordance with the invention.

FIG. 2 illustrates a sensor board 14 constructed according to the invention. The sensor board 14 is described below for use with a permanent magnet motor but the sensor board 14 and processor circuit 26 of the present invention can also be used to determine the position of other rotating components having angularly spaced magnetic elements. The sensor board 14 is manufactured using low-cost components according to standard printed circuit board fabrication techniques. The sensor board 14 includes twenty-seven magnetic sensors 22 equally spaced along an arc 42 (shown in phantom). In other embodiments the number of magnetic sensors 22 on the sensor board 14 is another odd integer multiple of three (e.g., 9, 15 or 21). The invention also contemplates even numbers of magnetic sensors 22, however, the angular resolution of the apparatus 10 using an even number of sensors 22 is half that possible using odd numbers of sensors 22 due to overlapping transitions in the states of the position signals PS. Each magnetic sensor 22 is spaced from the adjacent magnetic sensor 22 by an angular distance θ given by $$\theta = \frac{360°}{NS \times NP}$$

where NS is the number of magnetic sensors 22 on the sensor board 14 and NP is the number of pole pairs on the rotor of the motor.

Figure 3:
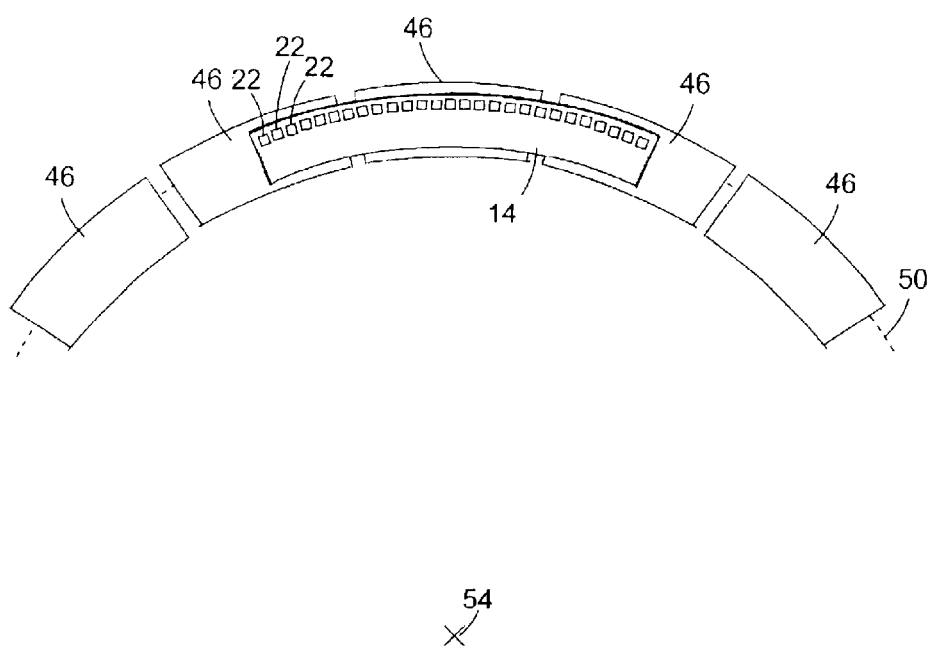
FIG. 3 is an illustration of the sensor board of FIG. 2 mounted near the rotor magnets of a motor.

FIG. 3 illustrates the sensor board 14 of FIG. 2 mounted near the permanent magnets 46 of a rotor for an eight pole pair motor (only five of sixteen poles shown). The sensor board 14 is mounted on any stationary portion of the motor and configured so that the plane of the sensor board 14 is parallel to the plane of the rotor. For example, the sensor board 14 can be mounted to an endplate of the motor. The rotor rotates about an axis 54 extending normal to the page. The radius of curvature of the arc 42 (see FIG. 2) defined by the sensor board 14 is approximately equal to the radius of a circle 50 defined by the position of the rotor magnets 46 about the axis of rotation 54. For motors having different pole counts, the size of the sensor board 14 (i.e., the length of the arc defined by the sensor board 14 is changed to span one pole pair.

The magnetic sensors 22 can be mounted on either side of the sensor board 14 if the local magnetic fields are sufficient to switch the sensors 22 between states. For example, the magnetic sensors 22 can be mounted on the side of the sensor board 14 that faces away from the permanent magnets 46 to avoid physical damage that might result from the rotor or other moving components of the motor. Alternatively, the magnetic sensors 22 can be mounted on the side of the sensor board 14 closest to the rotor if the magnitude of the local magnetic field at each magnetic sensor 22 is weak. In either configuration, the sensor board 14 can be enclosed with a protective cover to reduce or prevent mechanical damage.

As the motor operates, the passage of the rotor magnets 46 by the stationary sensor board 14 causes the local magnetic field at each magnetic sensor 22 to alternate between north and south. Consequently, the current-modulated electrical signals generated by the individual magnetic sensors 22 alternate between two possible signal states.

Figure 4:
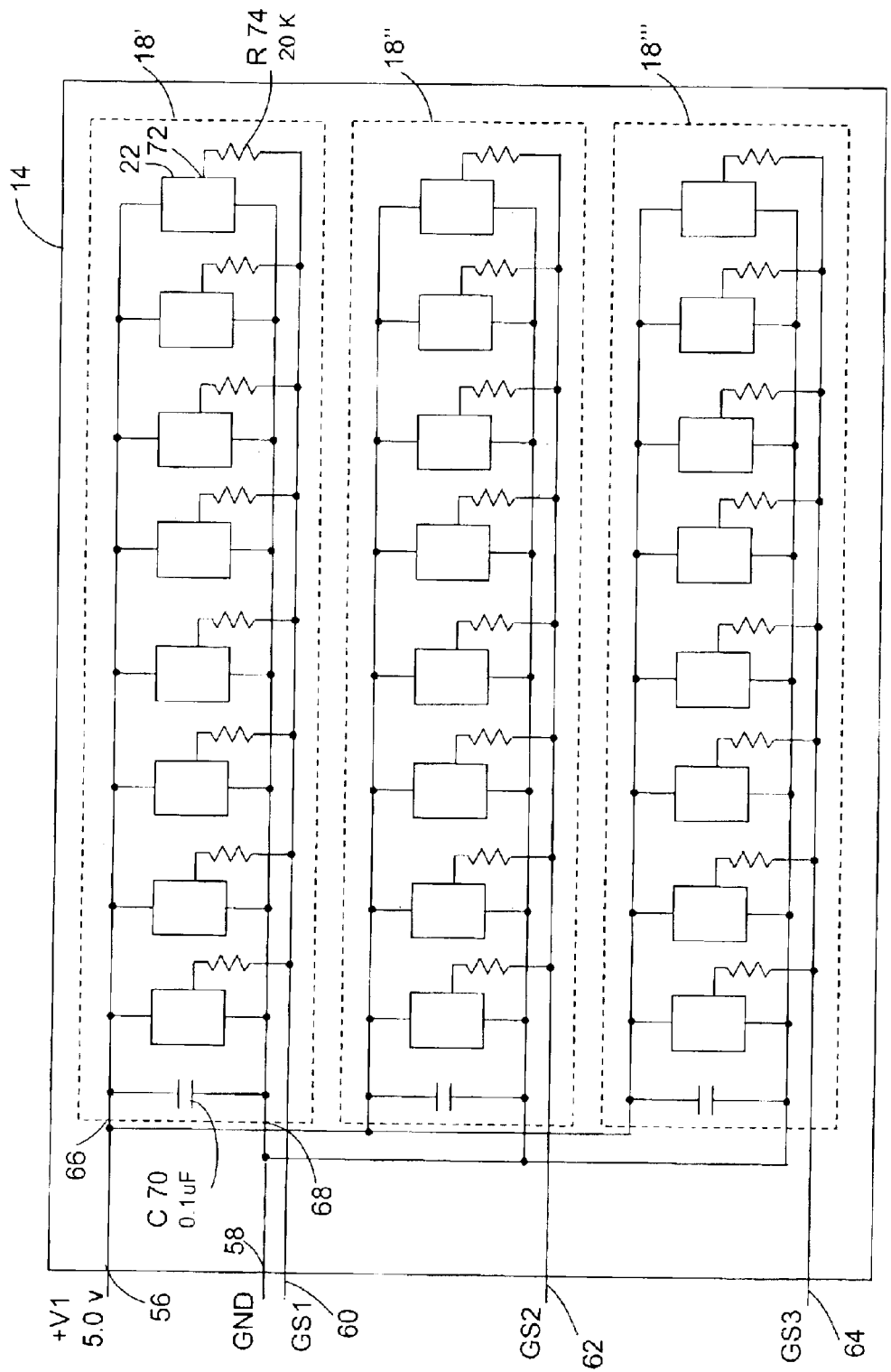
FIG. 4 is an electrical schematic diagram depicting the sensor board of FIG. 2.

FIG. 4 is an electrical schematic diagram depicting electrical components of the sensor board 14 of FIG. 2. Two terminals +V1 56 and GND 58 are used to receive reference voltages of 5.0 v and ground (0 v), respectively. Three additional terminals 60, 62 and 64 provide the electrical group signals GS1, GS2 and GS3, respectively. Each group signal terminal 60, 62, 64 is maintained at 3.3 v as described below. The following description of the sensor board 14 is limited to the components of the first sensor group 18' as the components of the other sensor groups 18", 18''' are similarly configured.

Two terminals 66 and 68 of the sensor group 18' are coupled to the voltage reference terminals +V1 56 and GND 58, respectively, of the sensor board 14 to receive power for the magnetic sensors 22. A noise bypass capacitor C 70 and the nine magnetic sensors 22 in the sensor group 18' are connected in parallel across the group terminals 58, 60. In one embodiment the magnetic sensors 22 are Hall-effect sensors (e.g., model no. US1881LUA manufactured by Melexis Inc.). Each magnetic sensor 22 has an output terminal 72 that is coupled to the group signal terminal 60 of the sensor group 18' through a respective resistor R 74.

In operation, the output terminal 72 of each magnetic sensor 22 is electrically coupled to the GND terminal 58 when the local magnetic field exhibits one polarity (e.g., north). The electrical path between the output terminal 72 and the GND terminal 58 is non-conducting when the local magnetic field exhibits the opposite polarity (e.g., south) or when no local magnetic field is present. The net resistance across the two terminals 66, 68 of the sensor group 18' indicates how many magnetic sensors 22 are exposed to the first polarity of the respective local magnetic field. Consequently, the magnitude of the current in the group signal GS1 is indicative of the number of sensors 22 exposed to the first polarity of the respective local magnetic fields. Furthermore, the group signal GS1 is a multi-state signal having ten possible current values corresponding to the number (i.e., zero to nine) of magnetic sensors 22 conducting current. As used herein, the term multi-state signal is to be construed to mean more than two states. The increment between current values in the illustrated embodiment is approximately 150 $\mu$A based on the voltage drop across the 20 K$\Omega$ resistor R 74 and a small voltage drop across the magnetic sensor 22.

Figure 5:
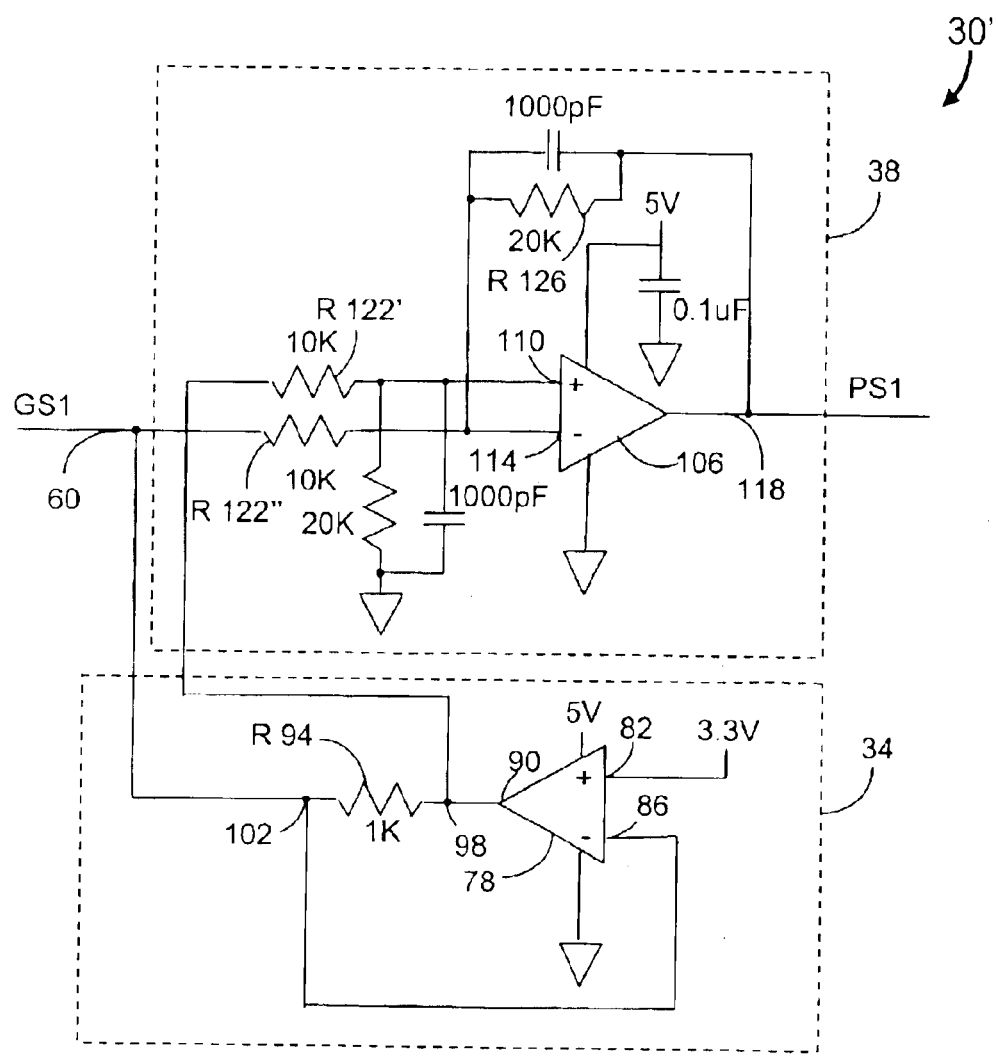
FIG. 5 is an electrical schematic diagram depicting one of the channel circuits in apparatus of FIG. 1.

FIG. 5 depicts a channel circuit 30' in FIG. 1 used to generate a 3.3 v reference voltage and to decode the group signal GS1 from the first sensor group 18'. The descriptions of channel circuits 30" and 30''' have been omitted for brevity because their configurations are similar to the following description of the first channel circuit 30'. The channel circuit 30' includes the driver circuit 34 and the decoder circuit 38, both of which are in electrical communication with the output terminal 60 of the first sensor group 18'.

The driver circuit 34 includes an operational amplifier 78 having input terminals 82 and 86, and an output terminal 90. The driver circuit 34 also includes a current sense resistor R 94. The output terminal 90 is electrically coupled to a first terminal 98 of the sense resistor R 94. One input terminal 82 receives a 3.3 v reference voltage and the other input terminal 86 is in electrical communication with the second terminal 102 of the sense resistor R 94. In operation, the driver circuit 34 maintains a DC voltage of 3.3 v at the second terminal 102 of the sense resistor R 94 and the output terminal 60 of the sensor group 18'.

The decoder circuit 38 includes an operational amplifier 106 having a first input terminal 110 in electrical communication with the output terminal 90 of the operational amplifier 78 in the driver circuit 34, a second input terminal 114 in electrical communication with the output terminal 60 of the sensor group 18' and an output terminal 118 to provide the position signal PS1. Input resistors R 122' and R 122" and a feedback resistor R 126 are selected with appropriate resistance values to achieve the desired differential amplification. In operation, the current of the multi-state group signal GS1 generates a voltage across the sense resistor R 94. In the illustrated embodiment, the voltage of the position signal PS1 generated at the output terminal 118 of the operational amplifier 106 is approximately twice the voltage across the sense resistor R 94.

Figure 6:
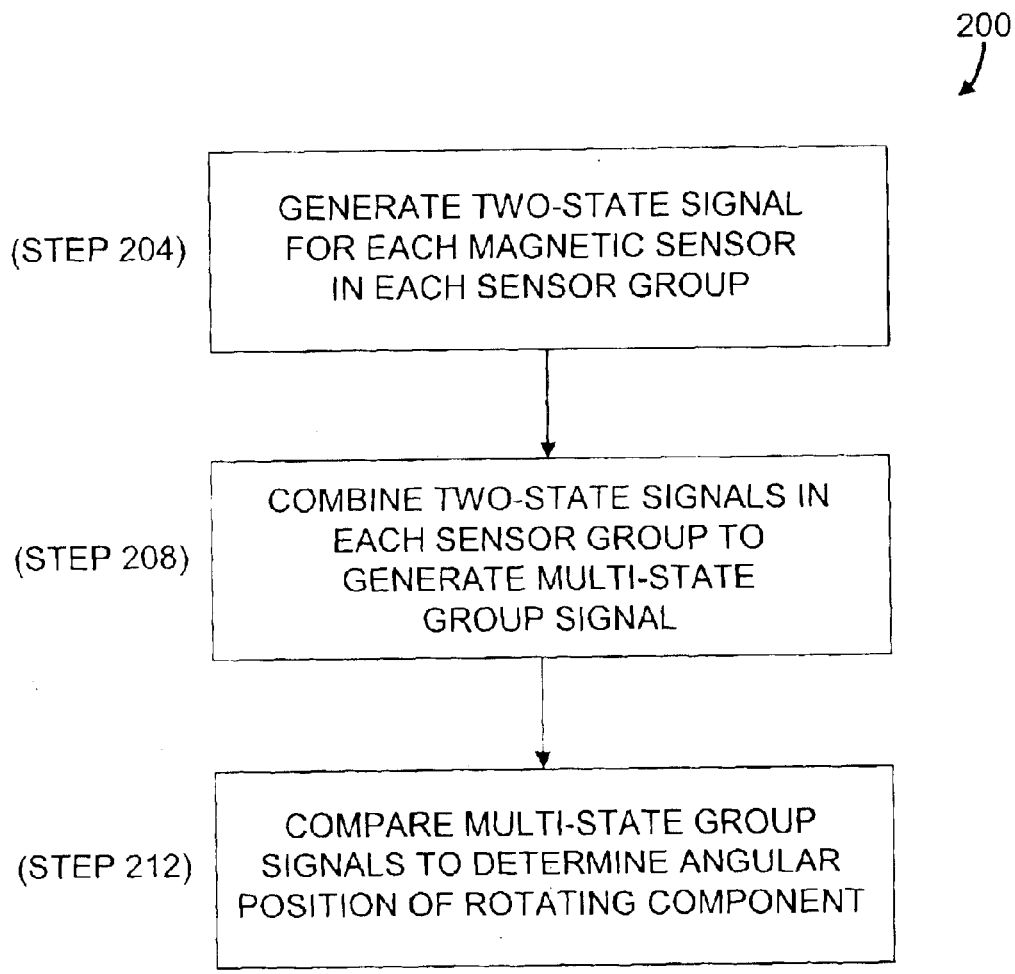
FIG. 6 is a flowchart representation of a method of determining the angular position of a rotating component having a plurality of angularly spaced magnetic elements in accordance with an embodiment of the invention.

FIG. 6 shows a flowchart depicting an embodiment of a method 200 for determining the angular position of a rotating component according to the invention. The method 200 with respect to the apparatus 10 as depicted according to FIGS. 4 and 5. The method 200 includes generating (step 204) a two-state signal responsive to the position of one or more of the angularly spaced magnetic elements on the rotating component. The two-state signal is generated for all of the magnetic sensors 22 on the sensor board 14.

For each sensor group, the two-state signals are combined (step 208) into a single multi-state group signal GS. For example, if the possible states of each two-state signal are represented by 150 $\mu$A and zero current, and if three of the magnetic sensors 22 in a sensor group are providing a non-zero current, the magnitude of the current in the group signal GS is 450 $\mu$A. The group signal GS in this example can have a current magnitude that varies from zero to 1.35 mA in 150 $\mu$A increments according to the position of the angularly spaced magnetic elements. To determine the angular position of the rotating component, the group signals GS are compared (step 212) using, for example, a window comparator routine or a state transition routine.

Figure 7:
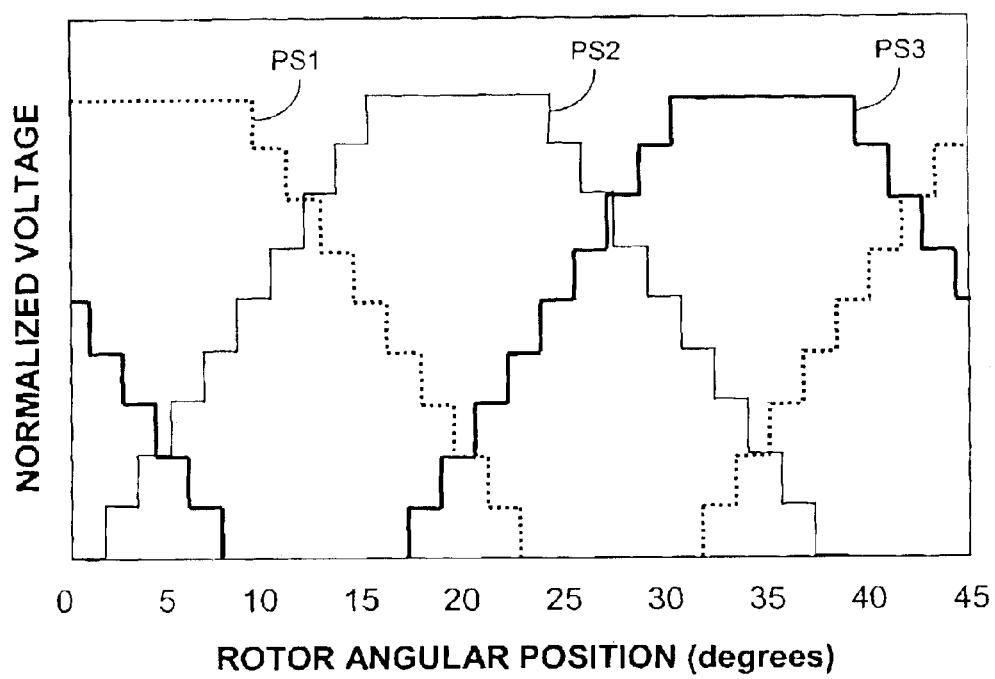
FIG. 7 is a graphical representation of electrical signals generated by the processor circuit of FIG. 1 for the sensor board of FIG. 2.

Referring to FIG. 7, the three position signals PS generated by the processor circuit 26 of FIG. 1 are graphically represented as a function of angular position of the rotor for en eight pole pair motor. The graph is limited to a 45° range as the depicted relationships arc repeated for each additional 45° of rotation. There are 54 state transitions defined by the stepwise transitions in the magnitude of the voltage of the three position signals PS. Thus, there are 6.67° (360°/54) of electrical phase of the position signals PS between consecutive state transitions. For comparison, angular position determination systems based on conventional three sensor Hall-effect systems, 8-bit encoders and 10-bit resolvers achieve electrical angular ranges of 60°, 11.250° and 2.8°, respectively. As a result, the position of the rotor in the eight pole pair motor can be uniquely determined by a single measurement of the three position signals PS to within an angular range of 0.833° (450°/54).

Referring back to FIG. 1, the controller 32 receives the position signals PS and executes window comparator and state transition routines. Because the states transition in a known order, error checking routines can be implemented to improve the noise immunity of the apparatus 10. These error checking routines result in better performance with the apparatus 10 of the present invention due to the high number of transitions per unit of rotation.

While the invention has been shown and described with reference to specific preferred embodiments, it should be understood by those skilled in the art that various changes in form and detail may be made therein without departing from the spirit and scope of the invention as defined by the following claims. For example, the magnetic sensors may react to opposite polarities than those described above. In another example, the reference voltages and component values for the sensor board and channel circuit can vary according to design preferences.

What is claimed is:

1. An apparatus for determining an angular position of a rotating component having an axis of rotation and having a plurality of angularly spaced magnetic elements, the apparatus comprising:

a sensor board disposed adjacent to the rotating component, the sensor board having a plurality of sensor groups, each of the sensor groups comprising a plurality of magnetic sensors disposed along an arc and positioned to sense a magnetic field of one of the angularly spaced magnetic elements, each of the sensor groups generating a respective multi-state group signal having stepwise transitions in magnitude in response to the passage of one of the angularly spaced magnetic elements by the respective sensor group; and a processor circuit in communication with each of the sensor groups and generating at least one position signal having stepwise transitions in magnitude in response to the multi-state group signals.

2. The apparatus of claim 1 wherein the magnetic sensors of each sensor group are configured in parallel electrical communication.

3. The apparatus of claim 1 wherein the rotating component is a permanent magnet rotor.

4. The apparatus of claim 1 wherein each of the magnetic sensors is spaced from an adjacent one of the magnetic sensors by a predetermined angular separation.

5. The apparatus of claim 1 wherein the magnetic sensors of each sensor group are positioned equidistant from the axis of rotation of the rotating component.

6. The apparatus of claim 1 wherein each multi-state group signal comprises a current signal.

7. The apparatus of claim 1 wherein the position signal comprises a plurality of multi-state voltage signals.

8. The apparatus of claim 1 wherein the sensor board has an odd number of sensors in each sensor group.

9. The apparatus of claim 8 wherein the number of sensor groups is three.

10. A method of determining the angular position of a rotating component having a plurality of angularly spared magnetic elements, the method comprising:

generating, for each of a plurality of magnetic sensors in each of a plurality of sensor groups, a two-state signal responsive to the position of at least one of the angularly spaced magnetic elements of the rotating component relative to the magnetic sensor;

combining, for each of the sensor groups, the two-state signals generated by the respective magnetic sensors to generate a respective multi-state group signal having stepwise transitions in magnitude; and comparing the multi-state group signals to determine the angular position of the rotating component.

* * * * *